United States Patent [19]

Sawada et al.

[11] Patent Number: 5,601,010
[45] Date of Patent: Feb. 11, 1997

[54] PISTON UNIT OF AN INTERNAL COMBUSTION ENGINE

[75] Inventors: Tomohiro Sawada; Shuji Inoue; Yuji Kato, all of Aichi pref., Japan

[73] Assignee: Aisin Seiki Kabushiki Kaisha, Kariya, Japan

[21] Appl. No.: 423,719

[22] Filed: Apr. 18, 1995

[30] Foreign Application Priority Data

Apr. 20, 1994 [JP] Japan ................................ 6-106101

[51] Int. Cl.$^6$ ............................................ F16J 1/04
[52] U.S. Cl. ......................... 92/222; 92/208; 123/193.6
[58] Field of Search ............................. 92/222, 208, 231, 92/260; 123/193.6

[56] References Cited

U.S. PATENT DOCUMENTS

| | | | |
|---|---|---|---|
| 4,595,638 | 6/1986 | Dohnomoto et al. | 428/614 |
| 4,868,067 | 9/1989 | Fujisawa et al. | 428/614 |
| 5,346,668 | 9/1994 | Tanaka et al. | 420/485 |
| 5,449,421 | 9/1995 | Hamajima et al. | 148/415 |

FOREIGN PATENT DOCUMENTS

| | | |
|---|---|---|
| 61-29041 | 2/1986 | Japan . |
| 4-69226 | 11/1992 | Japan . |
| 6-4464 | 1/1994 | Japan . |

*Primary Examiner*—Thomas E. Denion
*Attorney, Agent, or Firm*—Burns, Doane, Swecker & Mathis, LLP

[57] ABSTRACT

Piston unit used in an internal combustion engine, which allows no interfacial crack between a piston and a wear-proof ring as well as allowing to provide T6 treatment to aluminum base alloy used for the piston. The piston unit has a piston formed of aluminum base alloy, and a wear-proof ring that has been fused with a first ring groove of the piston. The wear-proof ring is formed of copper-zinc alloy with its thermal expansion coefficient ranging from $19.5 \times 10^{-6}$ m/m to $22.0 \times 10^{-6}$ m/m. The copper zinc alloy may contain 63 wt. % of copper, 30 wt. % of zinc, 15 wt. % of aluminum, and 4% of titanium, or it may contain 70 wt. % of copper and 30% of zinc only.

4 Claims, 2 Drawing Sheets

PISTON UNIT OF AN INTERNAL COMBUSTION ENGINE

BACKGROUND OF THE INVENTION

1. Field of Industrial Use

The present invention relates to a piston unit used in an internal combustion engine, which causes no interfacial crack between a piston and a wear-proof ring thereof.

2. Prior Art

Referring to FIG. 3, a cylinder 7 of a combustion chamber 70 in an internal combustion engine has a piston unit 9 placed therein, which serves to convert high pressure gas at high temperature generated in the combustion chamber 70 on the cylinder 7 into power. The piston unit 9 is composed of a piston 90 formed of aluminum base alloy, and three piston rings, i.e., a first piston ring 61, a second piston ring 62, and a third piston ring 63, which are inserted into a first ring groove 91, a second ring groove 92, and a third ring groove 93 formed in the piston 90, respectively. Among those piston rings, the first piston ring 61 is inserted into the first ring groove 91 with a wear-proof ring 910 interposed therebetween. The wear-proof ring 910 has been fused with the first ring groove 91.

The aforementioned wear proof-ring 910 serves to protect the first ring groove 91 which is formed in the closest position to the combustion chamber 70 so as to keep it from being worn under severe service condition.

A conventional wear-proof ring 910 has been proposed to employ, for example, nickel base alloy (Japanese Patent Publication No.: 69226 (1992)), cast iron, and the like.

The conventional piston 90 formed of the nickel base alloy is required to be subjected to aluminum coating after fusing of the wear-proof ring 910. The piston 90 formed of the cast iron is likewise required to be subjected to alfin treatment.

Since the wear-proof ring 910 and the piston 90 have different thermal expansion coefficients, interfacial crack might occur therebetween at cooling process after fusing, and further at T6 treatment (quenching, annealing) applied to the piston unit 9. The difference in the thermal expansion coefficients might cause the wear-proof ring 910 to strip off the piston 90, resulting in the piston unit failure.

The piston unit using a ceramics wear-proof ring has been also proposed in Utility Model Application Laid Open No.: 29041 (1986).

In this case, however, there is substantially a large difference in the thermal expansion coefficient between the wear-proof ring and the piston, which fails to allow the aluminum base alloy used for the piston to be subjected to the T6 treatment. As a result, strength and machinability of the piston unit might be degraded.

SUMMARY OF THE INVENTION

It is an object of the present invention to provide a piston unit used in an internal combustion engine, which prevents interfacial cracking between a piston and a wear-proof ring thereof, as well as allowing T6 treatment to the aluminum base alloy used as the piston.

A first invention relates to a piston unit of an internal combustion engine having a piston formed of aluminum base alloy, and a wear-proof ring which has been fused with a first ring groove of the piston at forming thereof. The wear-proof ring is formed of copper-zinc alloy with its thermal expansion coefficient in the range from $19.5 \times 10^{-6}$ m/m° C. to $22.0 \times 10^{-6}$ m/m° C.

Other features and advantages of this invention will be apparent from the following description and the accompanying drawings.

DETAILED DESCRIPTION OF THE PRESENT INVENTION

Figure 1:
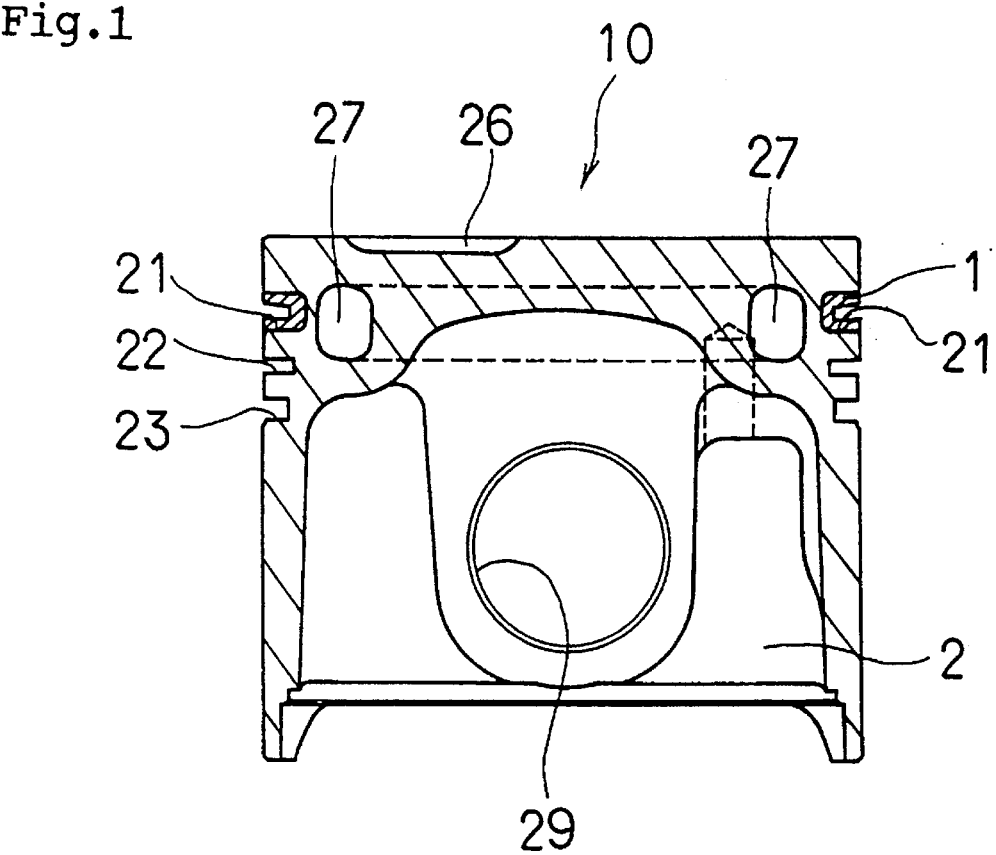
FIG. 1 is a sectional view of a piston unit used in an internal combustion engine of an Embodiment 1.

The wear-proof ring of the present invention is formed of copper-zinc alloy with its thermal expansion coefficient ranging from 19.5 to $22.0 \times 10^{-6}$ m/m° C. If the coefficient deviates from the above range, the coefficient difference between the wear-proof ring and the piston will become excessively large, resulting in interfacial crack therebetween. It is preferable to set the lower limit of the range to $20 \times 10^{-6}$ m/m° C., and the upper limit to $21.5 \times 10^{-6}$ m/m° C.

The above copper-zinc alloy is expected to be composed of copper, zinc, and aluminum (Cu-Zn-Al), which preferably contains 57–64 wt. % of copper, 22–36 wt. % of zinc, and 1.5–5.2% of aluminum (see Embodiments).

If the minimum wt. % of copper is less than 57%, the thermal expansion coefficient of the wear-proof ring might exceed its upper limit. While if the maximum wt. % exceeds 64%, it might become less than its lower limit.

If the minimum wt. % of zinc is less than 22%, the thermal expansion coefficient of the wear-proof ring might become less than its lower limit. While if the maximum wt. % exceeds 36%, it might exceed its upper limit.

If the minimum wt. % of aluminum is less than 1.5%, the wear-proof ring might decrease its wear-proof capability, failing to keep the piston from being worn. While if the maximum wt. % of aluminum exceeds 5.2%, the wear-proof ring might have increased production of copper-aluminum-compound thereon. This decreases the tenacity of the wear-proof ring, thus, degrading shock resistance thereof. The aforementioned type of wear-proof ring has improved wear-proof capability and tenacity because it contains 1.5–5.2 wt. % of aluminum.

Another type of copper-zinc alloy is expected to be composed of copper and zinc (Cu-Zn), and preferably contains 60–72 wt. % of copper and 28–40 wt. % of zinc. If the minimum wt. % of copper is less than 60%, thermal expansion coefficient of the wear-proof ring might exceed its upper limit. While if the maximum wt. % of copper exceeds 72%, the thermal expansion coefficient might be less than its lower limit.

If the minimum wt. % of zinc is less than 28%, the thermal expansion coefficient of the wear-proof ring might be less than its lower limit. While if the maximum wt. % of zinc exceeds 40%, it might exceed its upper limit.

The thermal expansion coefficient of aluminum base alloy used for the piston, for example, ranges from 20 to $21.5 \times 10^{-6}$ m/m° C.

A second invention relates to a piston unit of an internal combustion engine having a piston formed of aluminum base alloy, and a wear-proof ring which has been fused with a first ring groove of the piston. The wear-proof ring is formed of copper-zinc alloy with approximately the same thermal expansion coefficient as that of the aluminum base alloy.

The copper-zinc alloy has almost the same thermal expansion coefficient as that of the aluminum base alloy. That is, both coefficients are approximated to each other to a certain degree that may prevent interfacial cracking between the piston and the wear-proof ring due to thermal shock. The copper-zinc alloy may be the same one as that described in the first invention.

The piston unit used in an internal combustion engine of the first invention has a wear-proof ring which has been fused with the first ring groove of the piston. The copper-zinc alloy used for the wear-proof ring has approximately the same thermal expansion coefficient as that of the aluminum base alloy used for the piston. This serves to decrease differences in thermal contraction between the wear-proof ring and the piston. Even when the wear-proof ring is fused with the first ring groove of the piston, no interfacial crack occurs therebetween. The wear-proof ring is also kept from stripping off the piston.

The piston unit of the present invention allows the piston unit to be subjected to a cooling process after fusing of the wear-proof ring, and further to be subjected to the T6 treatment, thus enforcing functional ability of the piston unit by improving its strength and machinability.

The piston unit of the second invention has the wear-proof ring with approximately the same thermal expansion coefficient as that of the aluminum base alloy. As a result, no interfacial crack occurs between the piston and the wear-proof ring, thus providing the same effects as those obtained in the first invention.

As aforementioned, the present invention provides a piston unit used in an internal combustion engine, which causes no interfacial crack between the piston and the wear-proof ring thereof, as well as allowing the application of T6 treatment to the aluminum base alloy used for the piston.

DESCRIPTION OF THE PREFERRED EMBODIMENTS

Embodiment 1

Figure 2:
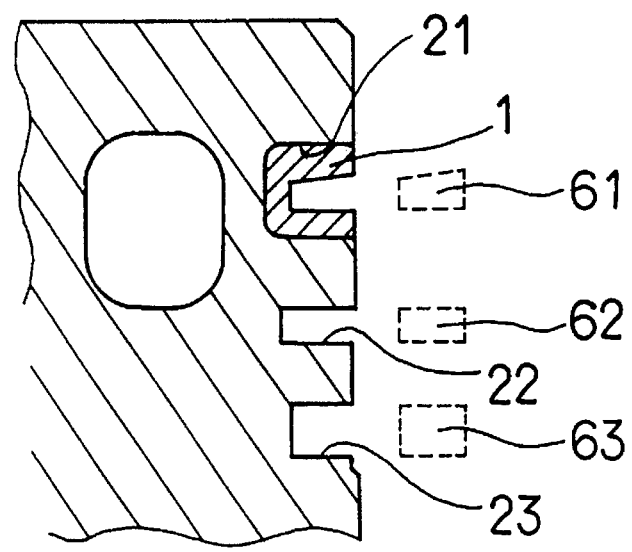
FIG. 2 is a sectional view of a main part of the piston unitused in the internal combustion engine of the Embodiment 1.
Figure 3:
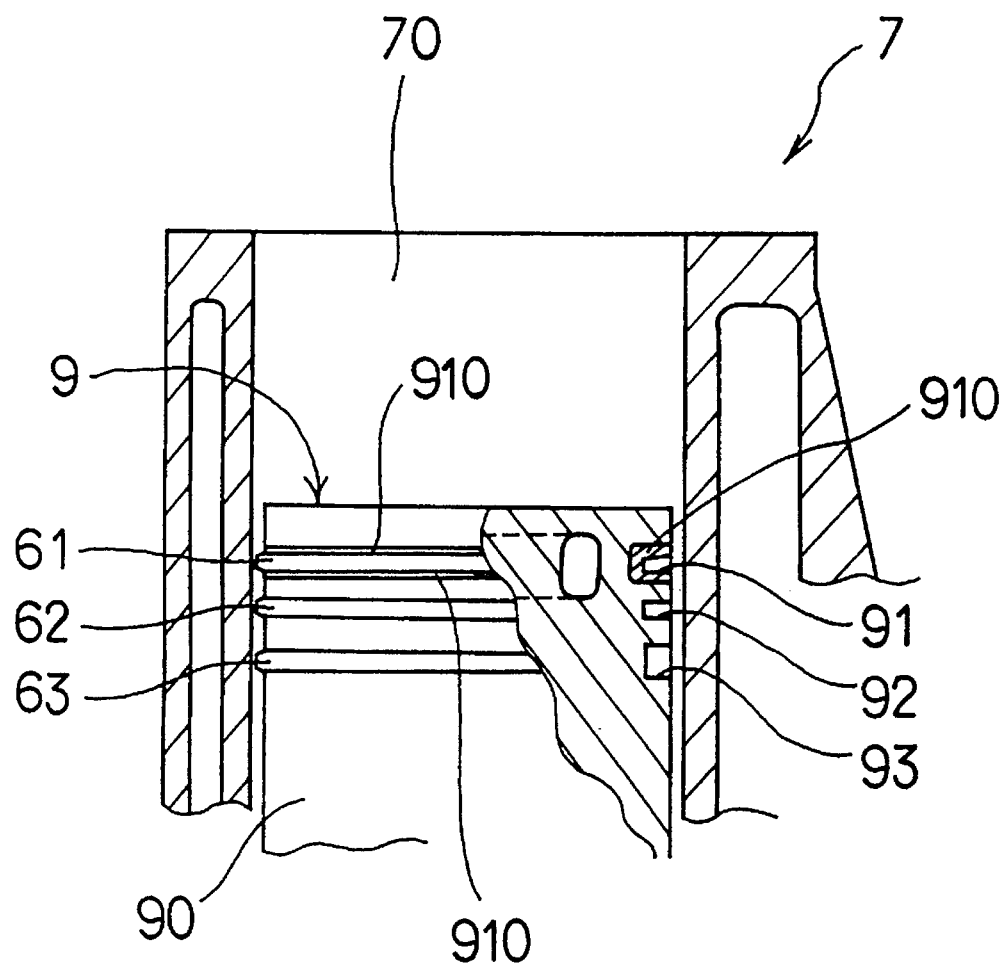
FIG. 3 is an explanatory view of a conventional piston unit of an internal combustion engine.

Referring to FIGS. 1 and 2, an explanation is described with respect to a piston unit used in an internal combustion chamber according to this embodiment of the present invention.

As FIGS. 1 and 2 show, a piston unit 10 is composed of a piston 2 formed of aluminum base alloy and a wear-proof ring 1 fused with a first ring groove 21 thereof.

The wear-proof ring 1 is formed of copper-zinc alloy (see Embodiment 2) with its thermal expansion coefficient of $20 \times 10^{-6}$ m/m $^\circ$ C . It serves to protect the first ring groove 21 formed to be in the closest position to a combustion chamber so as to keep it from being worn under severe service condition. The piston 2 has its thermal expansion coefficient of $21 \times 10^{-6}$ m/m $^\circ$ C.

The piston 2 has two other ring grooves, a second ring groove 22 and a third ring groove 23 below the first ring groove 21. These second and third ring grooves 22 and 23 have piston rings 62 and 63 inserted therein, respectively as FIG. 2 shows. The first ring groove 21 has a piston ring 61 inserted therein with the wear-proof ring 1 interposed therebetween. The piston rings 61 and 62 serve to maintain a seal with respect to the inner walls of the cylinder and to keep oil droplets from returning to the combustion chamber.

The piston 2 has a hollow section 27 on its top for cooling, and a junction hole 29 in its center for connecting a piston rod. It has a recess 26 on its upper surface for facilitating combustion efficiency.

In order to make the wear-proof ring 1 fuse with the piston unit 10, the molded wear-proof ring 1 is placed in a metal mold into which aluminum base alloy is poured to cover the periphery of the wear-proof ring 1.

The effect of the present invention is described.

The piston unit 10 of the present invention has the wear-proof ring 1 which has been fused with the first ring groove 21 of the piston 2. The material used for making the wear-proof ring, i.e., copper-zinc alloy, has approximately the same thermal expansion coefficient as that of aluminum base alloy used for making the piston 2. Differences in thermal contraction between the wear-proof ring 1 and the piston 2 is, thus, decreased. As a result, even when the wear-proof ring 1 is fused with the first ring groove 21 of the piston 2, no interfacial crack occurs between the wear-proof ring 1 and the piston 2 and the wear-proof ring 1 is kept from being stripped off the piston 2.

This type of piston unit allows the piston 2 to be subjected to a cooling process after fusing of the wear-proof ring 1 as well as T6 treatment. The T6 treatment enforces operability of the piston by improving its strength and machinability of the piston 2.

Embodiment 2

In this embodiment, many kinds of copper-zinc alloys were used to form the wear-proof ring to be formed into the piston unit so as to evaluate whether or not interfacial cracking occurred between the wear-proof ring and the piston in each type of the piston.

Each type of piston provided with a different wear-proof ring was made in the same manner as that used in Embodiment 1. This evaluation used 6 samples (Samples 1–6) as the present invention, and 4 samples (Samples C1–C4) as comparative examples.

The wear-proof rings of Samples 1 and 2 used copper-zinc alloy containing copper, zinc, aluminum, and the like as Table 1 shows. The wear-proof rings of Samples 3–6 used the alloy containing copper and zinc, and small amount of iron and lead. Thermal expansion coefficients of Samples 1–6 range from 19.9 to 20. $8 \times 10^{-6}$ m/m$^\circ$ C.

Samples C1 and C2 used Ni-resist nickel alloy cast iron having thermal expansion coefficients of $18.2 \times 10^{-6}$, and $18.7 \times 10^{-6}$ m/m$^\circ$ C., respectively.

Samples C3 and C4 used beryllium copper alloy. The alloy used for the sample C4 further contains nickel, cobalt, and aluminum. The thermal expansion coefficients of both samples resulted in $17.0 \times 10^{-6}$ m/m$^\circ$ C.

Each sample was subjected to the measurement with respect to the occurrence of interfacial cracking between the piston and the wear-proof ring. The measurement was executed based on a coloring flaw detection method after cutting cast surface to be removed. Results are shown in Table 1.

TABLE 1

| Samples | Component of wear-proof ring (wt %) | | | | | | | | Thermal expansion coefficient (×10⁻⁶/°C.) | Interfacial crack |
|---|---|---|---|---|---|---|---|---|---|---|
|  | Cu | Zn | Al | Mn | Si | Ti | Fe | Pb | | |
| Present invention | | | | | | | | | | |
| 1 | 63 | 29 | 3 | 3 | 2 | — | — | — | 20.0 | None |
| 2 | 61 | 30 | 5 | — | — | 4 | — | — | 20.0 | |
| 3 | 70 | 30 | — | — | — | — | ≦0.05 | ≦0.07 | 19.9 | |
| 4 | 67 | 33 | — | — | — | — | ≦0.05 | ≦0.07 | 20.3 | |
| 5 | 63 | 37 | — | — | — | — | ≦0.07 | ≦0.07 | 20.6 | |
| 6 | 61 | 39 | — | — | — | — | ≦0.07 | ≦0.10 | 20.8 | |
| Comparative example | | | | | | | | | | |
| C1 | Ni-resist Ni alloy cast iron (Spheroidal graphite) <FCDA> | | | | | | | | 18.2 | Present |
| C2 | Ni-resist Ni alloy cast iron (Needle graphite) | | | | | | | | 18.7 | |
| C3 | Beryllium copper alloy <C1720> | | | | | | | | 17.0 | |
| C4 | Beryllium copper alloy (Ni, Co, Al) | | | | | | | | 17.0 | |

※Those terms enclosed by <> represent JIS standard description.

As Table 1 shows, no interfacial crack occurred in Samples 1–6. while comparative samples C1–C4 had interfacial crack.

This is because that the wear-proof rings of Samples 1–6 used copper-zinc alloy with the thermal expansion coefficient in the range from 19.9 to 20.8×10⁻⁶m/m° C., which is approximately the same as that of the aluminum-base alloy of 21×10⁻⁶m/m° C. used for the piston.

While the invention has been described with reference to the embodiments, it is to be understood that modifications or variations may be easily made by a person of ordinary skill in the art without departing from the scope of this invention which is defined by the appended claims.

What is claimed is:

1. A piston unit of an internal combustion engine comprising a piston formed of aluminum base alloy and provided with a first ring groove, and a wear-proof ring fused with the first ring groove of said piston during formation, said wear-proof ring being formed of a copper-zinc alloy with its thermal expansion coefficient in the range from $19.5 \times 10^{-6}$ m/m° C. to $22.0 \times 10^{-6}$ m/m° C., said copper-zinc alloy containing 57–64 wt. % of copper, 22–36 wt. % of zinc and 1.5–5.2 wt. % of aluminum.

2. A piston unit of an internal combustion engine comprising a piston formed of aluminum base alloy and provided with a first ring groove, and a wear-proof ring fused with the first ring groove of said piston during formation, said wear-proof ring being formed of a copper-zinc alloy with approximately the same thermal expansion coefficient as that of said aluminum base alloy, said copper-zinc alloy containing 57–64 wt. % of copper, 22–36 wt. % of zinc and 1.5–5.2 wt. % of aluminum.

3. A piston unit of an internal combustion engine comprising a piston formed of aluminum base alloy and provided with a first ring groove, and a wear-proof ring fused with the first ring groove of said piston during formation, said wear-proof ring being formed of a copper-zinc alloy with its thermal expansion coefficient in the range from $19.5 \times 10^{-6}$ m/m° C. to $22.0 \times 10^{-6}$ m/m° C., said copper-zinc alloy containing 60 to 72 wt. % of copper and 28 to 40 wt. % of zinc.

4. A piston unit of an internal combustion engine comprising a piston formed of aluminum base alloy and provided with a first ring groove, and a wear-proof ring fused with the first ring groove of said piston during formation, said wear-proof ring being formed of a copper-zinc alloy with approximately the same thermal expansion coefficient as that of said aluminum base alloy, said copper-zinc alloy containing 60 to 72 wt. % of copper and 28 to 40 wt. % of zinc.

* * * * *